United States Patent Office 3,088,820
Patented May 7, 1963

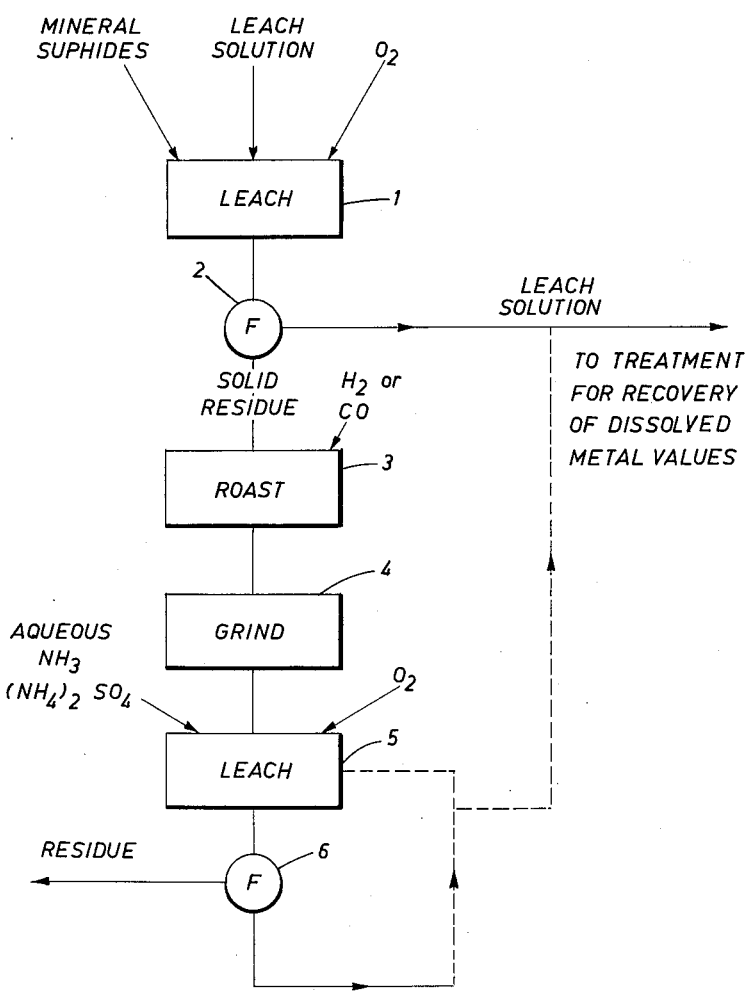

3,088,820
PROCESS FOR THE RECOVERY OF METAL VALUES FROM LOW GRADE MATERIALS
Vladimir Nicolaus Mackiw, Port Saskatchewan, Alberta, and John Pelham Warner, Edmonton, Alberta, Canada, assignors to Sherritt Gordon Mines Limited, Toronto, Ontario, Canada, a company of Ontario
Filed May 18, 1959, Ser. No. 813,942
6 Claims. (Cl. 75—7)

This invention relates to a process for the treatment of low grade metal bearing material. The process is particularly directed to the treatment of low grade metal bearing material which is not amenable to the economic concentration of desired metal values by conventional concentrating processes.

Hydrometallurgical methods are known for extracting desired metal values from metal bearing material and dissolving them in a leach solution. Methods are known, also, for recovering desired metal values as product metals suitable for use in industry from a leach solution in which they are present as dissolved salts, such as by electrolysis or by reacting the solution with a reducing gas at elevated temperature and pressure.

There is a problem in the extraction of desired non-ferrous metal values from metal bearing material in which the non-ferrous metal values are present as mineral sulphides by leaching at elevated temperature and under a positive partial pressure of oxygen. The leaching reaction proceeds rapidly initially and proceeds progressively more slowly as the metal bearing material is depleted in non-ferrous metal values. Thus, a relatively long leaching period is required to obtain substantially complete extraction of the non-ferrous metal values. It has been found, also, that non-ferrous metal values contained in the tailings, or undissolved residue, cannot be concentrated economically by any known concentration process. Thus, it has been necessary to operate the leaching process to obtain optimum recovery of desired metal values having regard to the cost of extending the leaching period to obtain maximum recovery and the value of the residual, unrecovered non-ferrous metals. Also, residual, non-ferrous metal values contained in the tailings or undissolved residue are not amenable to economic concentration by known concentration processes.

The problem is most acute when the metal bearing material contains oxidized metal values and/or pyrite and/or mixtures of pyrrhotite and pyrite. Desired non-ferrous metal values often cannot be extracted on a commercially practical, economic basis directly from such metal bearing material by any known method.

We have found that the problem of extracting desired non-ferrous metal values from metal bearing material which contains pyrite can be overcome by subjecting the material to a preliminary reducing roasting operation during which pyrite, $FeS_2$, and pyrrhotite, $Fe_nS_{n+1}$, are reduced to an iron compound which contains less sulphur than the pyrrhotite, and thereafter leaching the reduced material with an ammoniacal ammonium salt solution under a positive partial pressure of oxygen. If any of the desired non-ferrous metal values contained in the metal bearing material subjected to the preliminary reducing roasting operation are in oxidized condition, they are reduced, at least in part, to crude metallic form in which they are readily amenable to extraction by an oxidizing leaching process.

Under certain process conditions, it may be desirable to alter the quantity of sulphides in the material to be processed by an oxidizing roast. In this way, the ratio of sulphide and oxide in the material can be altered over a wide range limited only by the sulphide content of the original material and the complete elimination of sulphides. Conditions of the roast are not usually critical in such a case.

An understanding of the process of this invention can be obtained from the following description, reference being made to the accompanying drawing which illustrates a flow sheet of a preferred embodiment of the process.

The process is described hereinafter as applied to the treatment of a metal bearing residue which was derived from a previous oxidation leaching process indicated by the numeral 1. The material, after separation of leach solution, such as by filtering, indicated by the numeral 2, contained compounds of copper, nickel, cobalt and iron in the form of oxides and sulphides and, also, pyrite, $FeS_2$. This material is charged, preferably dry and in finely divided condition into a furnace 3 in which it is reacted at a temperature within the range of from about 1000° to 1650° F. with a reducing agent such as hydrogen to reduce ferric oxide to ferrous oxide and metallic iron and to decompose pyrite, $FeS_2$, according to the reactions represented by the following equations:

$$3Fe_2O_3 + H_2 \rightarrow 2Fe_3O_4 + H_2O \qquad (1)$$

$$Fe_2O_3 + H_2 \rightarrow 2FeO + H_2O \qquad (2)$$

$$Fe_2O_3 + 3H_2 \rightarrow 2Fe + H_2O \qquad (3)$$

$$FeS_2 + H_2 \rightarrow FeS + H_2S \qquad (4)$$

The roasting step is continued until the iron in sulphide form is reduced to its lowest state of oxidation, that is, ferrous sulphide, FeS. During this reducing roasting step, metal oxides contained in the feed material are reduced at least in part to crude metallic form. Oxides of copper, nickel and cobalt tend to reduce more rapidly than oxides of iron. Thus, the duration of the roasting period can be determined to obtain maximum reduction of ferric oxide to ferrous oxide and of non-ferrous metal oxides, if present in the feed material, without appreciable reduction of ferrous oxide to metallic iron. The reducing agent can be a solid, such as carbon or carbonaceous matter dispersed through the charge, or it can be in the form of a gas such as carbon monoxide or hydrogen, or mixtures of solid and/or gaseous reducing agents.

The reduced metal bearing material from the roasting step is ground lightly, as indicated by the numeral 4, to break up any agglomerates and to present fresh surfaces to the action of the leach solution and the free oxygen bearing gas in the leaching step. The material passed to the leaching step should be of a particle size smaller than 74 microns and preferably within the range of from about 74 to 38 microns.

The reduced metal bearing material is passed, after the grinding step, to the leaching step 5 in which it is leached with an ammoniacal ammonium sulphate solution at a temperature within the range of from about 100° to 250° F., preferably from 150° to 200° F., under a partial pressure of oxygen above 5 pounds per square inch, preferably within the range of from about 20 to 50 pounds per square inch. Leaching is continued to obtain maximum extraction of desired non-ferrous metal values and their dissolution in the leach solution. Leach solution from the leaching step, after separation of undissolved residue, as indicated by the numeral 6, can be treated by known methods for the recovery of dissolved non-ferrous metal values.

The leach solution produced by leaching the reduced calcine can be treated in any known manner for the recovery of the dissolved non-ferrous metal values. In the modification of the process illustrated in the drawing, part of the leach solution is recirculated to the leaching step and part is added to the main stream of leach solution which is passed to treatment for the recovery of the dissolved non-ferrous metal values.

The following examples illustrate the results which can be obtained in the treatment of a mixture of oxides and sulphides which contain relatively small amounts of copper, nickel and cobalt and a larger amount of iron which is not amenable to economic concentration by known concentrating processes.

*Example 1*

A leach residue produced in leaching metal sulphide concentrate with an ammoniacal ammonium sulphate solution in the presence of a free oxygen bearing gas containing 1.0% nickel, 0.29% cobalt, 0.17% copper, 54.2% iron and 13.8% sulphur and had a particle size within the range of from 147 to 10 microns. This material was reacted at a temperature of 1250° F. for 3 hours with a stream of hydrogen supplied at the rate of 1.7 litres per minute. On completion of the reducing reaction, the material had lost 17.5% of its original weight.

After light grinding to break up agglomerated particles, 600 grams of reduced material were dispersed in an ammoniacal ammonium sulphate solution contained in an autoclave. The solution contained 40 grams of ammonia and 250 grams of ammonium sulphate per litre. The leaching step was conducted for 4 hours at a temperature of 175° F. under a partial pressure of oxygen of 20 pounds per square inch maintained by feeding a stream of oxygen into the autoclave. Nickel, copper and cobalt were extracted from the reduced material during the leaching step and dissolved in the leach solution. Iron was converted to ferric oxide and reported in the undissolved residue. Sulphide sulphur was oxidized to ammonium sulphate and entered the solution.

Leach solution was separated from undissolved residue by filtration and passed to treatment for the recovery of dissolved non-ferrous metal values by known methods. Undissolved residue, after washing and drying, weighed 705 grams and contained, by weight, 0.04% nickel, 0.02% cobalt, less than 0.01% copper, 46.7% iron and 6.8% sulphur. This represented a recovery in the solution of 94.9% of the nickel, substantially 100% of the copper, 91.3% of the cobalt and 43.8% of the sulphur.

*Example 2*

A 600 gram sample of the same ammonia leach residue was treated under the same conditions as Example 1 with the difference that carbon monoxide was employed at the rate of 2.7 litres per minute in the reducing roasting step instead of hydrogen. The leach residue, after washing and drying, weighed 710 grams and contained 0.1% nickel, less than 0.01% copper, 0.08% cobalt, 45.6% iron and 5.9% sulphur. This represented a recovery in the leach solution of 89.9% of the nickel, 73.5% of the cobalt, substantially 100% of the copper and 49.7% of the sulphur.

The improved process of this invention possesses a number of important advantages. For example, the undissolved residue from a process in which metal sulphides are leached with an aqueous ammonia solution in the presence of a free oxygen bearing gas may contain up to 1% or more of the desired metal values. By the present process, the residue can be subjected to a reducing roast and releached with an ammoniacal ammonium salt solution to recover, in a relatively short leaching period, from 80% to 95% of the metal values which otherwise would be lost in the residue.

A further important advantage is derived from the fact that in leaching mineral sulphides with aqueous ammonia in the presence of a free oxygen bearing gas, extraction of desired metal values and their dissolution in the leach solution proceeds rapidly until from 70% to 80% of the desired metal values have been extracted and dissolved in the leach solution. The extraction then proceeds progressively more slowly as the leaching period is extended to obtain from about 90 to about 96 or 97% of the theoretical extraction. In actual practice in leaching nickeliferous mineral sulphides, it is found that a leaching period, or time of retention, of about 16 hours is required to obtain from 92% to 93% of the theoretical extraction. The present improved process permits the operation of the main leaching step for a period of from 3 to 4 hours to obtain, for example, from 75% to 85% of the theoretical extraction. The residue from this primary leaching step can then be separated from the pregnant leach solution and subjected to the reducing reaction described hereinabove and thereafter releached with an ammoniacal ammonium sulphate solution in the presence of a free oxygen bearing gas to extract substantially all the desired residual non-ferrous metal values and dissolve them in the leach solution. It is found that by this present improved process the overall extraction of desired metal values can be increased to from about 97% to 99% of the theoretical with a reduction in the overall leaching time of about 50%. This, of course, makes possible important savings in capital and operating costs in addition to the value of the additional non-ferrous metal values which are extracted and recovered.

It will be understood, of course, that departures can be made from the preferred embodiment of the process described and claimed herein without departing from the scope of the invention defined by the appended claims.

What we claim as new and desire to protect by Letters Patent of the United States is:

1. In a hydrometallurgical process for extracting nickel, copper and cobalt values from non-ferrous metal bearing mineral sulphides in which a mixture of iron sulphides and non-ferrous mineral sulphides is leached with an aqueous ammonia leach solution in the presence and under a partial pressure of a free oxygen bearing gas and non-ferrous metal values are extracted from and dissolved in the leach solution and undissolved residue, which contains non-ferrous metal values iron oxide and iron sulphide at least part of which is in the form of pyrite, is separated from the metal bearing leach solution, the improvement in combination therewith which comprises reacting said residue with a reducing agent at a temperature above about 1000° F. to reduce the pyrite content thereof to pyrrhotite with concurrent reduction of metal oxides to a lower state of oxidation, and thereafter leaching the reduced, non-ferrous metal bearing material at a temperature above about 100° F. with an ammoniacal ammonium sulphate solution in the presence and under a partial pressure of a free oxygen bearing gas, and continuing said last mentioned leaching step to extract non-ferrous metal values from said reduced non-ferrous metal bearing material and dissolve them in the leach solution.

2. The process according to claim 1 in which the reducing roasting reaction is conducted at a temperature within the range of from about 1000° F. to about 1650° F.

3. The process according to claim 1 in which the second mentioned leaching step is conducted at a temperature within the range of from about 150° F. to about 200° F. and under a partial pressure of oxygen above about 5 pounds per square inch.

4. The process according to claim 1 in which reduced calcine from the reducing roasting step is ground to a particle size smaller than about 74 microns before passing to the second mentioned leaching step.

5. The process according to claim 1 in which at least part of the second mentioned leach solution is passed, after separation of undissolved residue, to the first mentioned clarified leach solution.

6. A process for extracting non-ferrous metal values from a mixture of iron sulphide and non-ferrous mineral sulphides which comprises the steps of leaching said mixture in finely divided state in an aqueous ammoniacal leach solution at a temperature above 100° F. and under a positive partial pressure of oxygen above about 10 pounds per square inch; continuing said leaching step to extract non-ferrous metal values from said mineral sulphides and dissolve them in the leach solution, separating undissolved residue from said leach solution; roasting said undissolved residue in a reducing atmosphere at a temperature above about 1000° F.; continuing said reducing roasting operation to reduce iron sulphide contained in said residue to an iron compound which contains less sulphur than pyrrhotite, and thereafter leaching the reduced, non-ferrous metal bearing material at a temperature above about 100° F. with an ammoniacal ammonium sulphate solution in the presence and under a partial pressure of a free oxygen bearing gas, and continuing said last mentioned leaching step to extract non-ferrous metal values from said reduced non-ferrous metal bearing material and dissolve them in the leach solution.

References Cited in the file of this patent

UNITED STATES PATENTS

| | | |
|---|---|---|
| 2,556,215 | Queneau et al. | June 12, 1951 |
| 2,576,314 | Forward | Nov. 27, 1951 |
| 2,616,781 | Forward | Nov. 4, 1952 |
| 2,726,934 | Forward et al. | Dec. 13, 1955 |
| 2,400,115 | Hills et al. | May 14, 1956 |
| 2,829,963 | Hixson | Apr. 8, 1958 |
| 2,839,381 | Lee | June 17, 1958 |

FOREIGN PATENTS

| | | |
|---|---|---|
| 155,412 | Australia | Feb. 15, 1951 |